United States Patent
Valanarasu et al.

(10) Patent No.: US 11,361,633 B2
(45) Date of Patent: Jun. 14, 2022

(54) AUDIO TO HAPTICS WAVEFORM GENERATION USING ONSET DETECTION

(71) Applicant: TEXAS INSTRUMENTS INCORPORATED, Dallas, TX (US)

(72) Inventors: Kevin Selva Prasanna Valanarasu, Chennai (IN); Supriyo Palit, Kolkata (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 193 days.

(21) Appl. No.: 16/895,701

(22) Filed: Jun. 8, 2020

(65) Prior Publication Data

US 2021/0150865 A1 May 20, 2021

(30) Foreign Application Priority Data

Nov. 20, 2019 (IN) .............................. 201941047251

(51) Int. Cl.
  *G08B 6/00* (2006.01)
  *G06F 3/16* (2006.01)
  *H04R 3/04* (2006.01)

(52) U.S. Cl.
  CPC .............. *G08B 6/00* (2013.01); *G06F 3/165* (2013.01); *H04R 3/04* (2013.01); *H04R 2400/03* (2013.01)

(58) Field of Classification Search
  CPC .. G08B 6/00; G08B 1/08; G06F 3/165; H04R 3/04; H04R 2400/03; H04R 2460/13; H04R 3/12; H04R 2430/01; H04R 2430/03; H04R 25/606; H04R 9/06
  See application file for complete search history.

(56) References Cited

U.S. PATENT DOCUMENTS

| 7,979,146 B2 * | 7/2011 | Ullrich ................... G06F 3/016 340/407.1 |
| 2016/0027264 A1 * | 1/2016 | Choi ........................ G08B 6/00 340/407.1 |
| 2019/0227628 A1 * | 7/2019 | Rand ....................... G06F 3/016 |

OTHER PUBLICATIONS

Bello, Juan Pablo et al. "A Tutorial on Onset Detection in Music Signals." IEEE Transactions on Speech and Audio Processing, vol. 13, No. 5, Sep. 2005, pp. 1035-1047.
Dixon, Simon. "Onset Detection Revisited." Proc. of the 9th Int. Conference on Digital Audio Effects (DAFx-06), Montreal, Canada, Sep. 18-20, 2006, pp. 133-138.
Hainsworth, Stephen et al. "Onset Detection in Musical Audio Signals." Cambridge University Engineering Department, Aug. 2003, (https://www.researchgate.net/publication/2921601), 4 pages.

* cited by examiner

*Primary Examiner* — An T Nguyen
(74) *Attorney, Agent, or Firm* — John R. Pessetto; Charles A. Brill; Frank D. Cimino

(57) ABSTRACT

A method includes converting an audio signal of a current time period to a frequency domain to produce a set of frequency coefficients. For each of the frequency coefficients, the method includes computing a gradient of that frequency coefficient's magnitude relative to a magnitude of the same frequency coefficient from a previous time period. The method then includes summing the gradients computed for the set of frequency coefficients to produce a sum value, and then generating a haptic signal based on the sum value.

25 Claims, 3 Drawing Sheets

AUDIO TO HAPTICS WAVEFORM GENERATION USING ONSET DETECTION

CROSS-REFERENCE TO RELATED APPLICATION

This application claim priority to India Provisional Application No. 201941047251, filed Nov. 20, 2019, titled "Audio To Haptics Waveform Generation Using Onset Detection," which is hereby incorporated herein by reference in its entirety.

BACKGROUND

Some applications that execute on a client device generate audio. For example, a video game application executing on a mobile device (e.g., a cellular phone) generates the audio associated with the game. The mobile device also may include a linear resonant actuator (LRA) capable of vibrating. A haptic signal is generated to cause the LRA to vibrate further enhancing what the user experiences. For example, an explosion within a game can be experienced by the user of the mobile device as both audio from the device's speaker and vibration from the device's LRA.

SUMMARY

In at least one example, a method includes converting an audio signal of a current time period to a frequency domain to produce a set of frequency coefficients. For each of the frequency coefficients, the method includes computing a gradient of that frequency coefficient's magnitude relative to a magnitude of the same frequency coefficient from a previous time period. The method then includes summing the gradients computed for the set of frequency coefficients to produce a sum value, and then generating a haptic signal based on the sum value.

In at least one other example, a non-transitory storage device stores machine instructions which, when executed by one or more processors, causes the one or more processors to convert an audio signal of a current time period to a frequency domain to produce a set of frequency coefficients. For each of the frequency coefficients, the processors compute a gradient of that frequency coefficient's magnitude relative to a magnitude of the same frequency coefficient from a previous time period, sum the gradients computed for the set of frequency coefficients to produce a sum value, and generate a haptic signal based on the sum value.

In yet another example, a device includes one or more central processing unit (CPU) cores, an analog-to-digital converter (ADC) coupled to the CPU cores, a digital-to-analog converter (DAC) coupled to the CPU cores, and a storage device coupled to the CPU cores. The storage device contains machine instructions which, when executed by the one or more CPU cores, cause the one or more CPU cores to convert an audio signal of a current time period to a frequency domain to produce a set of frequency coefficients. For each of the frequency coefficients, the one or more CPU cores compute a gradient of that frequency coefficient's magnitude relative to a magnitude of the same frequency coefficient from a previous time period, sum the gradients computed for the set of frequency coefficients to produce a sum value, and generate a haptic signal based on the sum value.

BRIEF DESCRIPTION OF THE DRAWINGS

For a detailed description of various examples, reference will now be made to the accompanying drawings in which.

DETAILED DESCRIPTION

Some systems that include LRAs have pre-stored haptic waveforms that are provided to the LRA within the system when, for example, the magnitude of the audio signal in one or more predetermined frequency bands exceeds a threshold. At that point, the pre-stored haptic waveform is retrieved and provided to the LRA. Such systems include narrowband linear filters to determine when to play the pre-stored haptic waveform. Unfortunately, a narrowband filter has a propagation delay that is large enough such that that the pre-stored haptic waveform may not be sufficiently synchronized with the associated audio signal. For example, the haptic waveform may cause the LRA to begin vibrating after the audible explosion begins (e.g., with a delay of 20 ms or more) thereby providing an unsatisfactory user experience. Further, pre-stored (static) haptic waveforms are not customized to the audio experienced by the user (e.g., all explosions will have the same haptic waveform even if such explosions have different audio signals).

The examples described herein address these issues. The onset of certain sounds for which haptic feedback is desired (e.g., gun shots, explosions, etc.) is characterized by sudden changes in spectral energy distribution. The short-time Fourier transform of the audio signal during such onset events exhibits a significant increase in energy across most or all audio frequency bands. The examples described herein take advantage of this wide spectral energy distribution characteristic to detect the onset of sounds for which haptic feedback is beneficial.

Figure 1:
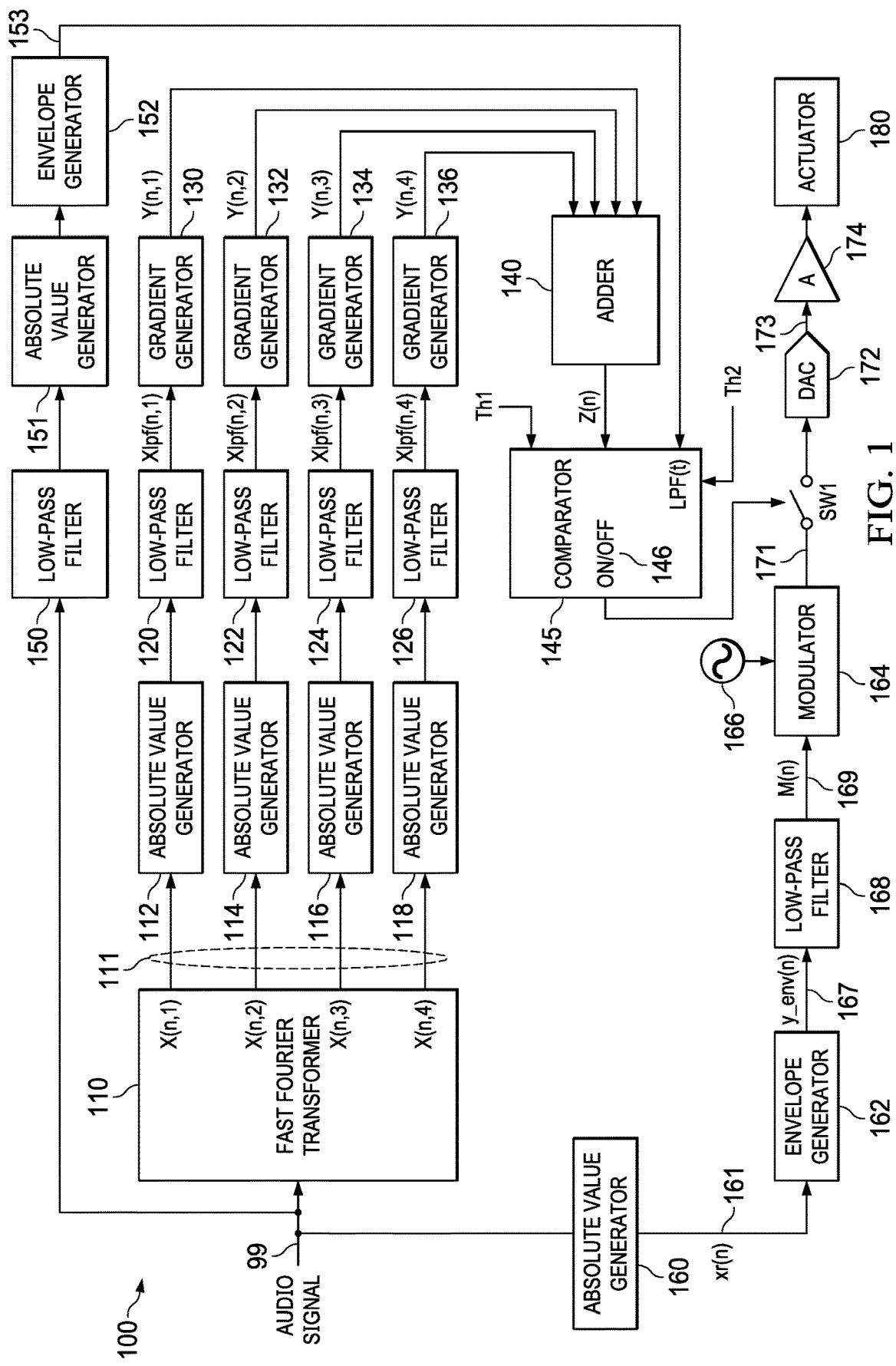
FIG. 1 illustrates a device that generates haptic signals based on audio signals.

FIG. 1 shows an example of a system 100 in which an audio signal 99 is processed to detect an onset event. An onset event refers to the beginning of an audio sequence in the audio signal 99 for which haptic feedback is desired. Examples of such audio sequences include gun shots and explosions. In some implementations, the system 100 is a mobile device such as a cellular phone, tablet device, etc.

System 100 in the example of FIG. 1 includes a Fast Fourier Transformer (FFT) 110, absolute value generators 112, 114, 116, 118, 151, and 160, low-pass filters 120, 122, 124, 126, 150, and 163, gradient generators 130, 132, 134, and 136, an adder 140, a comparator 145, envelope generators 152 and 162, a modulator 164, a digital-to-analog converter (DAC) 172, and an amplifier 174. The system 100 also includes, or is coupled to, an actuator 180. The actuator 180 provides haptic feedback to the user of the system. In one example, the actuator 180 is a linear resonant actuator (LRA). An LRA is a vibration motor that produces an oscillating force along a single axis. An LRA uses a time-varying (e.g., sinusoidal) voltage to drive a conductive coil that produces an electromagnetic field. The electromagnetic field moves a magnetic mass that is connected to a spring, resulting in a haptic vibration. A magnetic mass is made of magnetic material and thus has its own magnetic field. The electromagnetic field of the conductive coil interacts with the magnetic field of the magnetic mass to generate an oscillating force. At least some cellular phones use LRAs to produce a wide range of vibrotactile effects. Because cellular phones are battery-powered, it is desirable that the power consumption of the LRA is relatively low and so it is necessary to drive the LRA at its resonant frequency to derive maximum efficiency. Other types of consumer electronics, e.g. tablets, laptops, and video game controllers, also use LRAs to provide haptic vibration feedback. The AC voltage provided to the LRA has a frequency that is at, or very near, the resonant frequency of the LRA. In one example, the resonant frequency of an LRA is 175 Hz, and the frequency of the driving AC voltage is 175 Hz+/−2%.

In at least one implementation, the FFT 110, absolute value generators 112, 114, 116, 118, 151, and 160, low-pass filters 120, 122, 124, 126, 150, and 168, gradient generators 130, 132, 134, and 136, adder 140, comparator 145, envelope generators 152 and 162, and modulator 164 are implemented by one or more processor cores executing software that causes the processor core(s) to perform the functionality described herein attributed to these components.

Absolute value generators 112, 114, 116, and 118 can calculate the absolute value of complex FFT coefficients. Absolute value generators 151 and 160 calculate the absolute value of real numbers (real audio signal) and rectify them.

The audio signal 99 comprises an electrical signal which, when provided to a speaker, causes sound to emanate from the speaker. The audio signal 99 may be generated by an application such as a game application. The audio signal 99 (which may be a digital signal) is windowed and each window is converted from the time domain into the frequency domain by FFT 110. The size of each window of the audio signal 99 on which the FFT is performed can be any suitable length. To detect the onset of sudden changes in audio (explosions and the like) and to reduce the latency of the system, the window size may be relatively short, such as a window size in the range of 4 to 64 samples if the audio is sampled at, for example, 48 kilosamples per second (kSps). In one example, the FFT 110 implements a 4-point FFT. The example of FIG. 1 illustrates that the FFT 110 outputs four FFT coefficients at 111 for each window. The FFT coefficients are labeled X(n,k), where n is the index of the time window and k is the index of the FFT coefficient. The four FFT coefficients are thus designated X(n,1), X(n,2), X(n,3), and X(n,4)

The FFT coefficients 111 are then processed by respective absolute value generators 112-118. Each absolute value generator computes the absolute value of FFT coefficients as $\sqrt{a^2+b^2}$ where each of the FFT coefficients X(n,k) is of the form a+ib. Because only onsets of a particular rise time are to be detected, the magnitudes of each coefficient 111 are smoothed through the low-pass filters 120-126. Absolute value generator 112 provides its output to the input of low-pass filter 120. Similarly, absolute value generators 114, 116, and 118 provide their outputs to the inputs of low-pass filters 122, 124, and 126, respectively. The output signals from low-pass filters 120-126 are designated Xlpf(n,1), Xlpf(n,2), Xlpf(n,3), and Xlpf(n,4).

The outputs of the low-pass filters 120-126 are provided to inputs of respective gradient generators 130-136. Each gradient generator 130-136 determines the difference between the current output of its respective low-pass filter and the filter output from a previous time window. The output of the gradient generators is designated Y(n,k). Each gradient generator computes:

$$Y(n,k)=X\text{lpf}(n,k)-X\text{lpf}(n-m,k) \quad (1)$$

where k is the coefficient index corresponding to the gradient generator and m is an index to a previous time window. In one example, m may index the time window that immediately precedes the nth time window.

The gradient generators' outputs (i.e., Y(n,1), Y(n,2), Y(n,3), and Y(n,4)) are provided to inputs of adder 140 and summed together. The adder 140 thus sums the gradients, Y(n,k), over all of the coefficients k to generate a sum signal, Z(n), for the current time window n. The sum signal, Z(n), is computed as:

$$Z(n)=\Sigma_{k=0}^{N-1}w_k*Y(n,k) \quad (2)$$

where $w_k$ is a weight for coefficient k and N is the window size. In some implementations, the weight is the same for all of the coefficients and thus Z(n) is the unweighted sum of the gradients. In other implementations, Z(n) is a weighted sum with at least one coefficient being weighted differently than at least one other coefficient. Further still, a weight for a particular frequency band's gradient can be zero thereby causing the associated frequency band to be neglected altogether.

Sum signal Z(n) is then compared to a threshold, Th1, by comparator 145. Each peak in Z(n) across the time windows signifies a potential onset. Threshold Th1 is set such that an onset event is detected responsive to Z(n) exceeding Th1. The on/off output signal 146 of comparator 145 is asserted to a first state (e.g., high, "1") when Z(n) exceeds Th1. The on/off signal 146 being set to the first state causes switch SW1 to close thereby providing a haptic signal to the actuator 180, as explained below. The system 100 also includes logic (described below as well) to determine when to cease the haptic signal to the actuator 180 and causes the on/off signal 146 to be asserted to a second state (e.g., low, "0") to open switch SW1.

As explained above, the resonator 180 has a resonant frequency and thus the haptic signal provided to the resonator 180 has a frequency that is equal to, or approximately equal to, the actuator's resonant frequency. In one example, the resonator's resonant frequency is 175 Hz. Sinusoidal signal generator 166 generates a sinusoidal signal at 175 Hz (or whatever is the resonant frequency of the corresponding actuator). The audio signal 99 is rectified by absolute value generator 160 and the rectified audio signal xr(n) 161 is provided to envelope generator 162.

The envelope generator 162 produces an output signal 167 that generally tracks the peaks of the rectified audio signal xr(n) 161 for each time sample from the absolute value generator 160. In one example, the envelope generator 160 is implemented as a fast attack and slow release filter. The output signal y_env(n) 167 rises along with increases in the input rectified audio signal 161. However, if the rectified audio signal xr(n) 161 falls rapidly, output signal y_env(n) 167 decays more slowly, at a pre-configured decay rate. The pseudo-code implementation of the envelope generator 162 is:

if $xr(n)>y\_\text{env}(n-1)$ then $y\_\text{env}(n)=xr(n)$ else if $xr(n)<y\_\text{env}(n-1)$ then $y\_\text{env}(n)=D*y\_\text{env}(n-1)$ where D is a pre-set or programmable decay factor. When a new rectified audio value xr(n) exceeds the prior window's envelope signal, y_env(n−1), then the envelope signal y_env(n) is set equal to the new rectified audio value, xr(n). However, if the new rectified audio value xr(n) is less than the prior window's envelope signal y_env(n−1), which means the audio signal 99 is decreasing, then the envelope signal is reduced in accordance with the decay rate, D. In one example, D equals 0.99 which approximately corresponds to a decay time constant of 2 ms assuming the audio is sampled at 48 kSps, but can be set to any desired value. With this implementation, the output envelope signal, y_env (n), will respond quickly and rise with the input to the peak value. However, when the audio signal falls after the peak, the envelope will be biased to remain high to track the envelope. In the example pseudo-code above, fast attack is an instantaneous attack. This will ensure envelope detection with relatively low latency. Slow release may be configured to be slower than the time period corresponding to the lowest signal frequency of audio signal 99. Slow release will result in a natural and crisp haptic experience.

The envelope signal, y_env(n), is provided to low-pass filter 168 and thus low-pass filtered to provide a modulation signal M(n). The modulator 164 modulates the amplitude of the sinusoidal signal from the sinusoidal signal generator 166 using M(n). As such, the envelope of the modulator's output signal 171 is M(n). If the on/off signal 146 from the comparator 145 indicates that the actuator should be driven by a haptic signal, the modulator output signal 171 is provided to DAC 172, which converts the modulator output signal to an equivalent analog signal 173 (e.g., a voltage). The analog signal 173 is the amplified by amplifier 174 and the amplifier's output signal is the haptic signal to drive the actuator 180.

The audio signal 99 is low-pass filtered by low-pass filter 150 and the filter's output is rectified by absolute value generator 151 and the rectified audio signal is provided to envelope generator 152. Envelope generator 152 can be implemented in much the same as was for envelope generator 162, described above. The output signal 153 of the envelope detector is provided to the LPF(t) input of the comparator 145. The comparator 145 compares the output signal 153 to a threshold Th2. Once an onset is detected and a haptic signal is provided to the actuator, the magnitude of the output signal 153 is monitored to determine when it falls below Th2 for a predetermined period of time (e.g., 50 ms). Responsive to the output signal 153 being below Th2 for the predetermined period of time, the comparator 145 causes the on/off signal 146 to the second state mentioned above which thereby causes the switch SW1 to open thereby ceasing the haptic signal from being provided to the actuator 180.

Figure 2:
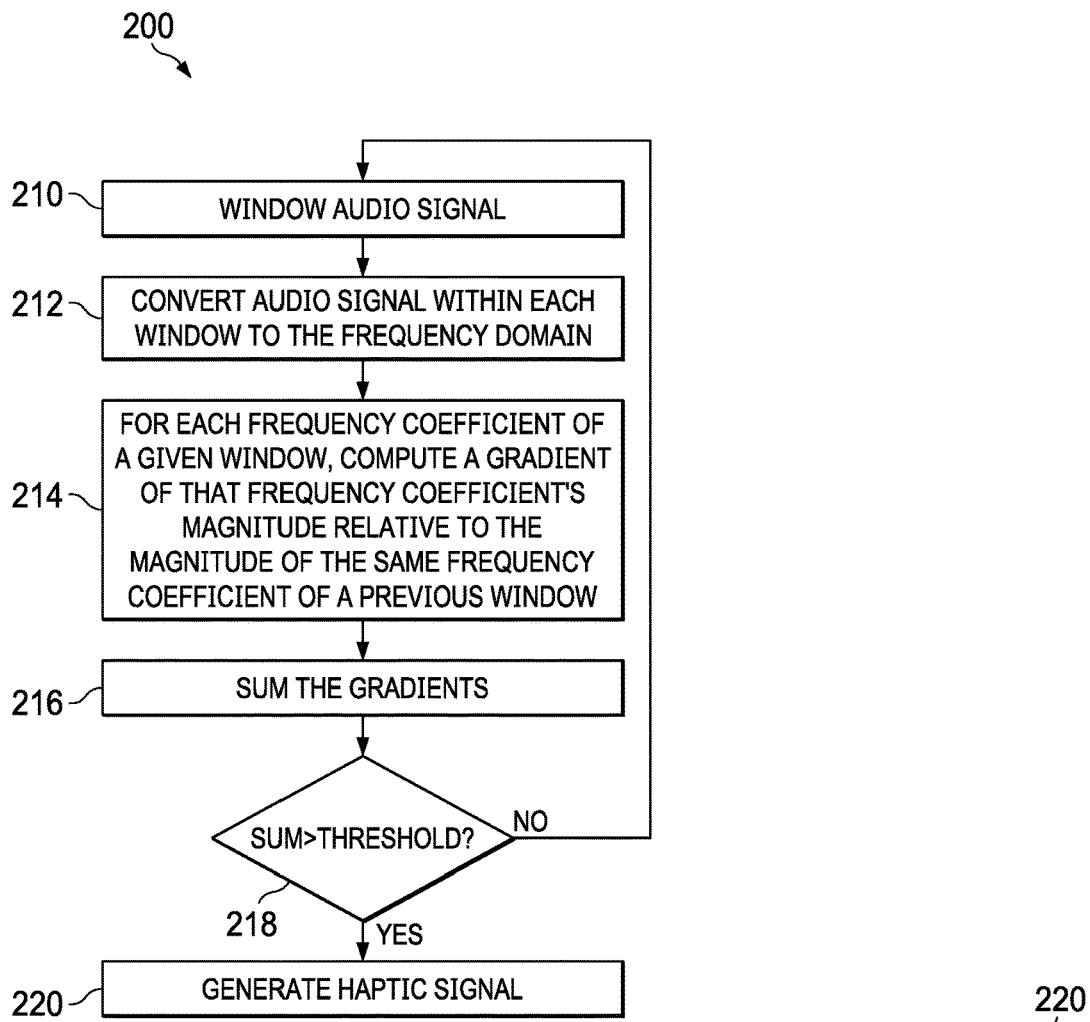
FIG. 2 is an example of a method for detecting an onset event for generating the haptic signals.

FIG. 2 provides a method 200 for detecting an onset event. At 210, the audio signal 99 is windowed. The length of the window may be any suitable length. In one example, the window length is 4 samples. The digital samples comprising audio signal 99 may be saved in memory. The samples of each window are then converted to the frequency domain at 212. In one example, an FFT is performed on the samples of each window, and the FFT in a further example may be a 4-point FFT.

At 214, for each frequency coefficient of a given window, the method comprises computing the gradient of that frequency coefficient's magnitude relative to the magnitude of the same frequency coefficient of a previous window. The previous window may be the immediately preceding window, or a window prior to that.

At 216, the method comprises summing the gradients across all of the frequency coefficients. The sum may be a weighted or unweighted sum. If the summed value is less than a threshold (e.g., Th1), a haptic signal is not generated and control loops back to 210. However, if the summed value is greater than the threshold, then at 220 the method includes generating a haptic signal. The actuator 180 is driven by the haptic signal.

Figure 3:
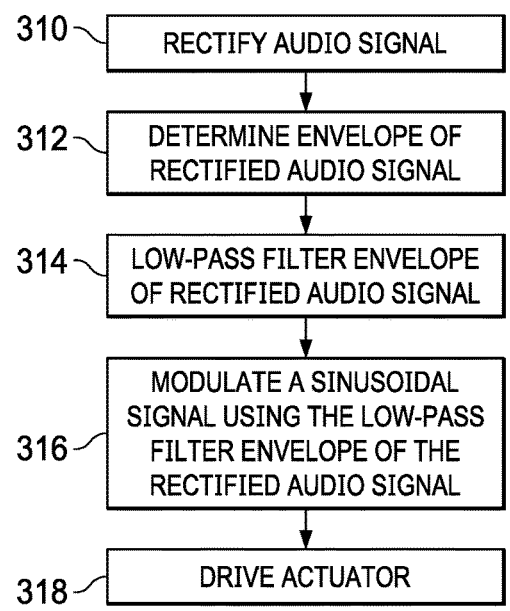
FIG. 3 is an example of a method for using an envelope of the audio signal to modulate a sinusoidal signal at the resonant frequency of an actuator.

FIG. 3 shows an example method for generating the haptic signal (220). At 310 in FIG. 3, the audio signal is rectified using the absolute value generator. At 312, the method includes determining an envelope of the rectified audio signal such as through the use of a fast attack/slow release filter as described above, and at 314, the envelope is low-pass filtered. At 316, the filtered envelope is used to modulate a sinusoidal signal. The sinusoidal signal has a frequency approximately equal to the resonant frequency of the actuator. At 318, the actuator 180 is driven with the modulated sinusoidal signal. Signal conditioning may be applied to the modulated sinusoidal signal (e.g., conversion from digital to analog, amplification, etc.).

Figure 4:
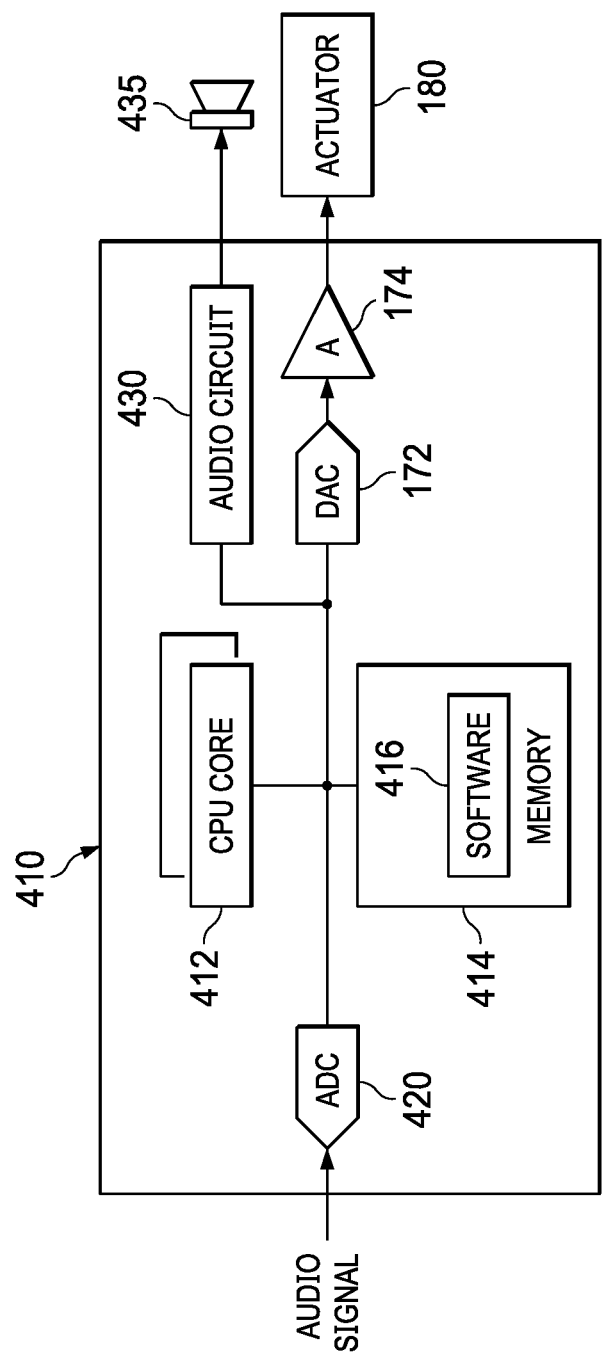
FIG. 4 shows another example of a device for generating haptic signals.

FIG. 4 shows an example of an integrated circuit (IC) 410 in which the techniques described herein can be implemented. The IC 410 in the example of FIG. 4 includes one or more central processing unit (CPU) cores 412 (also referred to as processor), memory 414, an analog-to-digital converter (ADC) 420, DAC 172, amplifier 174, and an audio circuit 430. Additional components can be included as part of IC 410. Audio circuit 430 receives audio signals from the CPU core(s) 412 and processes the audio signals for driving a speaker 435, which can be coupled to the IC. Audio thus is generated by the speaker 435.

Memory 414 may comprise any type of memory device including volatile memory (e.g., random access memory), non-volatile memory (e.g., read-only memory), or combinations thereof. Software 416 is stored in memory 414 and is accessible to the CPU cores 412. The software comprises machine instructions that are executable by the CPU cores. Upon execution of the software 416, the CPU core(s) 412 implements the functionality described above for generating and ceasing haptic signal for driving an actuator. The software 416 may be executed on one CPU core 412, or distributed across two or more CPU cores.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A method, comprising:
    converting an audio signal of a current time period to a frequency domain to produce a set of frequency coefficients;
    for each of the frequency coefficients, computing a gradient of that frequency coefficient's magnitude relative to a magnitude of the same frequency coefficient from a previous time period;
    summing the gradients computed for the set of frequency coefficients to produce a sum value;
    generating a haptic signal based on the sum value.

2. The method of claim 1, wherein converting the audio signal to the frequency domain includes performing a 4-point FFT.

3. The method of claim 1, further comprising determining an absolute value of each frequency coefficient before computing the gradient.

4. The method of claim 1, further comprising low-pass filtering each absolute value before computing the gradient.

5. The method of claim 1, wherein summing the gradients comprises computing a weighted sum of the gradients with at least one gradient being weighted differently than at least one other gradient.

6. The method of claim 1, wherein generating the haptic signal comprises determining an envelope of the audio signal and modulating a sinusoidal signal using the audio signal's envelope to produce a modulated sinusoidal signal.

7. The method of claim 6, further comprising low-pass filtering the envelope of the audio signal to produce the haptic signal.

8. The method of claim 1, further comprising generating a haptic onset signal responsive, at least in part, to the sum value being greater than a threshold.

9. The method of claim 1, further comprising:
low-pass filtering the audio signal to produce a low-pass filtered audio signal;
determining an envelope of the low-pass filtered audio signal;
responsive to a magnitude of the envelope being less than a first threshold value for a second threshold period of time, discontinuing the haptic signal.

10. A non-transitory storage device storing machine instructions which, when executed by one or more processors, causes the one or more processors to:
convert an audio signal of a current time period to a frequency domain to produce a set of frequency coefficients;
for each of the frequency coefficients, compute a gradient of that frequency coefficient's magnitude relative to a magnitude of the same frequency coefficient from a previous time period;
sum the gradients computed for the set of frequency coefficients to produce a sum value;
generate a haptic signal based on the sum value.

11. The non-transitory storage device of claim 10, wherein, when executed, the machine instructions further cause the one or more processors to determine an absolute value of each frequency coefficient before computing the gradient.

12. The non-transitory storage device of claim 10, wherein, when executed, the machine instructions further cause the one or more processors to low-pass filter each absolute value before computing the gradient.

13. The non-transitory storage device of claim 10, wherein, when executed, the machine instructions further cause the one or more processors to sum the gradients as a weighted sum of the gradients with at least one gradient being weighted differently than at least one other gradient.

14. The non-transitory storage device of claim 10, wherein, when executed, the machine instructions cause the one or more processors to generate the haptic signal by determining an envelope of the audio signal and modulating a sinusoidal signal using the audio signal's envelope to produce a modulated sinusoidal signal.

15. The non-transitory storage device of claim 14, wherein, when executed, the machine instructions further cause the one or more processors to low-pass filter the envelope of the audio signal to produce the haptic signal.

16. The non-transitory storage device of claim 14, wherein, when executed, the machine instructions cause the one or more processors to generate a haptic onset signal responsive, at least in part, to the sum value being greater than a threshold.

17. The non-transitory storage device of claim 10, wherein, when executed, the machine instructions further cause the one or more processors to:
low-pass filter the audio signal to produce a low-pass filtered audio signal;
determining an envelope of the low-pass filtered audio signal; and
responsive to a magnitude of the envelope being less than a first threshold value for a second threshold period of time, discontinue the haptic signal.

18. A device, comprising:
one or more central processing unit (CPU) cores;
an analog-to-digital converter (ADC) coupled to the one or more CPU cores;
a digital-to-analog converter (DAC) coupled to the one or more CPU cores;
a storage device coupled to the one or more CPU cores, the storage device storing machine instructions which, when executed by the one or more CPU cores, cause the one or more CPU cores to:
convert an audio signal of a current time period to a frequency domain to produce a set of frequency coefficients;
for each of the frequency coefficients, compute a gradient of that frequency coefficient's magnitude relative to a magnitude of the same frequency coefficient from a previous time period;
sum the gradients computed for the set of frequency coefficients to produce a sum value;
generate a haptic signal based on the sum value.

19. The device of claim 18, wherein, when executed, the machine instructions further cause the one or more processors to determine an absolute value of each frequency coefficient before computing the gradient.

20. The device of claim 18, wherein, when executed, the machine instructions further cause the one or more processors to low-pass filter each absolute value before computing the gradient.

21. The device of claim 18, wherein, when executed, the machine instructions further cause the one or more processors to sum the gradients as a weighted sum of the gradients with at least one gradient being weighted differently than at least one other gradient.

22. The device of claim 18, wherein, when executed, the machine instructions cause the one or more processors to generate the haptic signal by determining an envelope of the audio signal and modulating a sinusoidal signal using the audio signal's envelope to produce a modulated sinusoidal signal.

23. The device of claim 22, wherein, when executed, the machine instructions further cause the one or more processors to low-pass filter the envelope of the audio signal to produce the haptic signal.

24. The device of claim 22, wherein, when executed, the machine instructions cause the one or more processors to generate a haptic onset signal responsive, at least in part, to the sum value being greater than a threshold.

25. The device of claim 18, wherein, when executed, the machine instructions further cause the one or more processors to:
low-pass filter the audio signal to produce a low-pass filtered audio signal;

determining an envelope of the low-pass filtered audio signal; and responsive to a magnitude of the envelope being less than a first threshold value for a second threshold period of time, discontinue the haptic signal.

\* \* \* \* \*